W. W. WATTERSON.
PROCESS OF DEPOSITING SODA, &c.
APPLICATION FILED SEPT. 8, 1919.
1,350,128.                                             Patented Aug. 17, 1920.
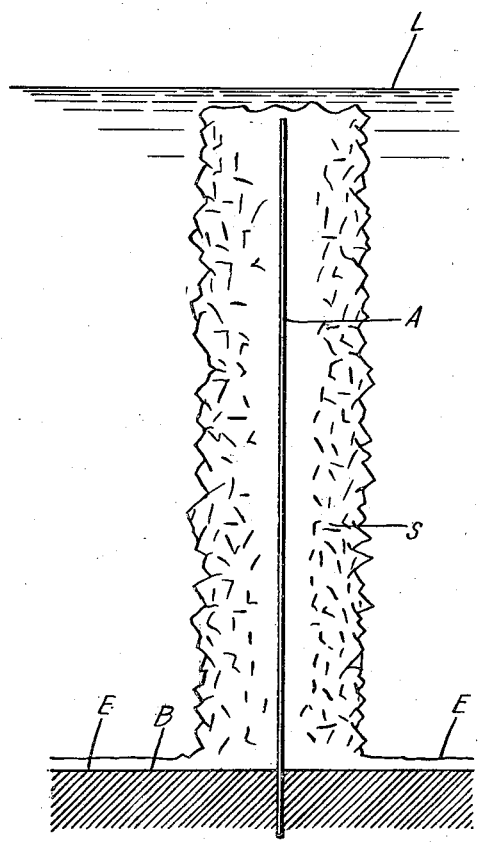
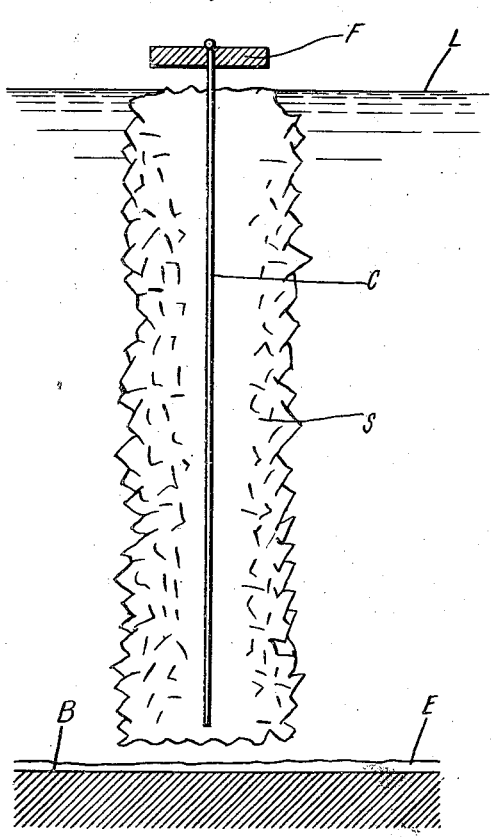
Inventor.
Wilfred W. Watterson
by
his Attorney.

# UNITED STATES PATENT OFFICE.

WILFRED W. WATTERSON, OF BISHOP, CALIFORNIA.

PROCESS OF DEPOSITING SODA, &c.

1,350,128.   Specification of Letters Patent.   Patented Aug. 17, 1920.

Application filed September 8, 1919. Serial No. 322,567.

*To all whom it may concern:*

Be it known that I, WILFRED W. WATTERSON, a citizen of the United States, residing at Bishop, in the county of Inyo, State of California, have invented new and useful Improvements in Processes of Depositing Soda, &c., of which the following is a specification.

This invention relates to processes for obtaining deposits from solutions; having especial reference, although not being limited, to the deposit of such substances as soda from natural solutions, or solutions made from natural deposits of soda and other substances.

As found in natural state in some of the salt lakes of the West or as made from natural alkaline deposits, solutions carrying soda and other desirable salts also carry a quantity of contaminating matter; that is, other salts which may or may not be valuable for recovery. Processes for the recovery of soda from such solutions, or for the recovery of other salts, such as borax or potassium chlorid from such solutions, are sometimes if not quite generally, preceded by concentration of such solutions in large open solar vats. These vats are conveniently made along the edges of lakes, or in the vicinity of deposits, and are formed merely by making suitable embankments to inclose a body of solution, say twelve inches or so deep. Solar evaporation and concentration in these open vats may be carried on to any desired extent, either to precipitate some of the contained salts directly in the vat, or to bring the solution down to or near the point of saturation for the particular salt or salts desired to be recovered. In some of these natural or artificial solutions, such as are found at Owens lake in California, the soda in solution, either in the form of sodium carbonate or sodium bicarbonate, or both, is sometimes greatly in excess of the other salts in solution. Consequently a proportion at least of the soda may be obtained by merely precipitating it out of the solution by proper evaporation and concentration. But when soda is thus precipitated in vats it is practically impossible to remove the precipitate from the bottom of the vat without removing earthy matter from the bottom of the vat. The method which has been largely practised has been to accumulate a deposit in the bottom of a vat until it becomes quite thick and then plow it up and remove it. Soda thus obtained has always required refining before it can be used.

It it the object of my invention to provide a method and process which will overcome the above mentioned difficulties, and procure a pure and clean deposit of soda or other matter deposited or crystallized out of a solution. As applied to soda my method obtains a pure clean crystalline deposit which is practically pure—in fact pure enough that it may be immediately ground up or otherwise broken and used without further refining process. I accomplish my object by providing a suitable base upon which the soda may crystallize, free from the contaminating influence of the bottom of the vat. I prefer to do this by the simple expedient of putting sticks or the like in the vat, forcing the lower ends of the sticks into the earth in the bottom of the vat, and allowing the top end of the stick to be just below the surface of the solution. I illustrate such an arrangement in the accompanying drawings in which Figure 1 shows how soda or the like deposits in crystalline form upon such an upright "stick"; and Fig. 2 similarly shows how the deposit may take place upon a pendant.

It will be understood that when I say "stick" I intend to mean anything of that nature, which will perform the functions I herein describe. For instance, I may use a fairly stiff or coarse straw, or a rather slender stick of wood or bamboo or the like; or I may (although this is not preferred) support a string, a cord, or a stick, or anything of like nature from its upper end, as is illustrated in the drawings, as an alternative arrangement. Whatever kind of material is used to form the base upon which the deposit is made, it is only essential that it shall be capable of being ground or broken up with the deposited soda, and that it be not of such material as will contaminate the soda for ordinary uses or will interfere with its chemical or other treatment, such as furnacing. Thus I do not use anything of metal, or any material which by its chemical properties would contaminate the soda, or by its physical properties would be objectionable in the finally ground soda. I prefer to use a fibrous material, such as wood, or such as cotton or hemp or other fiber, because these materials may be ground up and also because they are combustible, and, in a great many of the uses to which the soda may be put, will be burned away.

In the drawings I show at A a stick or the like standing in the bottom B of such a vat as herein described. The solution or liquor stands to the level shown at L, the top of the stick A being just covered. At C I show a stick or a string or the like suspended from any suitable overhead frame work at B; the frame work being preferably above the liquid level L, so that the framework itself will not become encrusted with the crystals of deposition.

As the liquid is evaporated and the solution concentrated, soda crystals are deposited. These soda crystals are deposited upon a stick or string or the like A or C, and gradually a body of crystal deposit grows, somewhat in the form shown at S. This crystal deposit may be allowed to become comparatively very large, say as much as three or four inches in diameter before removal. In the case of the stick which stands in the bottom of the vat, it will be seen that the crystal deposit on the stick extends down to rest upon or join the bottom deposit E. There is always a certain amount of this bottom deposit, which usually is not perfectly clean; and the crystal deposit around the stick A joins this bottom deposit, or rests upon it or upon the bottom B, as the case may be; so that, as the accretion of crystals around the stick A increases, the column of crystals supports itself and does not depend upon the stick A for its support. In fact, the column of crystals only depends upon the stick A for its support during the initial stages of deposition. Consequently the stick may be comparatively slender, and so small that, when a column of crystal deposit, say four inches in diameter has been formed, the stick forms a very small fraction of one per cent. of the total mass.

The advantage of having the top of the stick below the level of the liquid is that deposit of contaminating salt, such as sodium chlorid, etc., is thereby prevented on any exposed upper part of the stick or of the crystalline deposit. If the stick or the crystalline deposit projects above the liquid level, the spray, or the rise and fall of the liquid level, will deposit a film of solution on the upper part of the stick which, when evaporated, will leave contaminating salts upon the upper part of the otherwise pure crystalline deposit. This is true of the form shown at the right in the drawing, where the upper end of the crystalline deposit will accumulate a certain amount of such impurity. However, in this case, the large body of crystalline deposit within the liquid, will be a pure crystalline deposit. And also, in this case, the stick or string or the like need not reach the bottom of the vat, so that there is no possible contamination from touching the bottom deposit. However, in the case shown at the left of the drawings, the crystalline deposit about the base is easily separated from the bottom deposit; and furthermore, any impurities which adhere to the crystalline deposit may be easily washed off with cold or warm water. A small amount of such impurities will usually adhere either to the top of the crystalline deposit, where the crystalline deposit extends clear to the top of the liquid, or to the bottom of the crystalline deposit due to contact with the bottom deposit; but these contaminations, particularly in the case shown at the left in the drawings, are very small and sometimes practically negligible. Also when the liquid is withdrawn from the vat, or when the level is gradually lowered by evaporation, there will be a certain amount of contaminating salt deposit upon the outer surface of the body of crystalline deposit, due to evaporation of the film of liquid thus left upon the exterior of the crystalline deposit. This deposition of impurities, however, can be and easily is washed off with either cold or warm water.

In the particular application of my invention herein referred to—the deposition of soda crystals—the substances deposited may be either sodium carbonate or sodium bicarbonate, or urao—a combination of the two carbonates with some water of crystallization. Just what chemical composition the crystalline deposit will have depends upon the substances in the liquid solution.

In any case, the crystalline deposit I find to be so pure and clean that it is ready for further use without any refining process. For instance, if the soda is to be used without undergoing any chemical transformation I merely take the deposits, after they have been removed from the vat, and grind them entirely with their supporting stick. A stick of an eighth inch diameter forms only about one-tenth of one per cent. of the total mass of a body four inches in diameter. The contamination caused by the stick is thus extremely small, even if the soda is used without any transformation which gets rid of the stick. However, if the soda is to be furnaced before it is used, or in the course of using it, the stick is consumed.

It will now be seen that my process comprises particularly the deposition of salt from a solution upon a non-contaminating stick or the like, allowing the deposition to proceed until the deposited mass is comparatively large, relative to the mass of the stick itself, and then grinding up or otherwise breaking up the whole mass, including the stick. This process or method I find very effective for obtaining practically pure soda Having described a preferred form of my invention, I claim:

1. The herein described process of obtaining salts from solution, embodying the crystallization of such salts onto a relatively small stick, allowing such crystallization to continue until the deposited mass is comparatively large relatively to the mass of the stick, and then breaking up the whole mass, including the stick.

2. The herein described process of obtaining salts from solution, embodying the formation of a crystalline deposit on a stick combustible in its nature and of such a chemical nature as will not contaminate the deposited crystals, allowing the crystalline deposit to increase until such deposit is of large mass compared with the mass of the stick, and then breaking up the whole mass including the stick.

3. The herein described process of obtaining salts from solution, embodying the formation of a crystalline deposit on a stick combustible in its nature and of such a chemical nature as will not contaminate the deposited crystals, allowing the crystalline deposit to increase until such deposit is of large mass compared with the mass of the stick, and then heating the whole mass, including the stick, to such a temperature as to cause combustion of the stick.

4. The herein described process of obtaining salts from solution, embodying the placement of a relatively long and slender stick in a substantially upright position in such solution, with the upper end of the stick below the level of the solution, allowing salt to deposit in crystalline form upon the stick and allowing the crystalline deposit to grow until the mass of the deposit is large compared with the mass of the stick, removing the crystalline mass and stick, washing the crystalline mass exteriorly to remove exterior impurities, and breaking up the whole mass, including the stick.

5. The herein described process of obtaining salts from solution, embodying the formation of a crystalline deposit on a stick combustible in its nature, and then heating the whole mass, including the stick, to such a temperature as to cause combustion of the stick.

6. The herein described process of obtaining salts from solution, embodying the formation of a crystalline deposit on a stick, and then breaking up the whole mass including the stick.

7. The herein described process of obtaining salts from solution by crystallization, embodying placing a stick in a vat of the solution and entirely submerged therein, and allowing crystals to form on the stick.

8. The herein described process of obtaining salts from solution by crystallization, embodying placing a stick upright in a vat of the solution with the lower end of the stick supported by the vat bottom, allowing crystals to form on the stick, and then separating the stick and its crystalline deposit from the vat bottom and from the crystalline deposit on the vat bottom.

9. The herein described process of obtaining salts from solution by crystallization, embodying placing a stick in a vat of the solution and entirely submerged therein, and allowing crystals to form on the stick; then removing the stick with its crystalline deposit and breaking up the whole mass including the stick.

10. The herein described process of obtaining salts from solution by crystallization, embodying placing a combustible stick in a vat of the solution and entirely submerged therein, and allowing crystals to form on the stick; then removing the stick with its crystalline deposit and breaking up the whole mass including the stick; then heating the broken mass, including the stick, to such a temperature as to cause combustion of the stick.

11. The herein described process of obtaining salts from solution by crystallization, embodying placing a combustible stick in a vat of the solution and entirely submerged therein, and allowing crystals to form on the stick; then removing the stick with its crystalline deposit and heating the whole mass including the stick to such a temperature as to cause combustion of the stick.

12. The herein described process of obtaining soda by crystallization from solutions containing contaminating salts such as herein described, embodying placing a stick in a vat of such solution entirely submerged therein, and allowing deposit of crystals thereon and then removing the stick with its crystalline deposit.

13. The herein described process of obtaining soda by crystallization from solutions containing contaminating salts such as herein described, embodying placing a stick in a vat of such solution entirely submerged therein, and allowing deposit of crystals thereon and then removing the stick with its crystalline deposit; then washing the deposit exteriorly to remove contaminating salts which have dried on its exterior.

In witness that I claim the foregoing I have hereunto subscribed my name this 18th day of August, 1919.

WILFRED W. WATTERSON.

Witnesses:
  J. C. CLAUSON,
  J. S. HENDERSON.